No. 801,378. PATENTED OCT. 10, 1905.
E. HART.
MANUFACTURE OF ARTICLES FROM FUSED MATERIAL.
APPLICATION FILED DEC. 4, 1902.

WITNESSES:
INVENTOR
Edward Hart
BY
ATTORNEYS

UNITED STATES PATENT OFFICE.

EDWARD HART, OF EASTON, PENNSYLVANIA, ASSIGNOR TO GENERAL CHEMICAL COMPANY, OF NEW YORK, N. Y., A CORPORATION OF NEW YORK.

MANUFACTURE OF ARTICLES FROM FUSED MATERIAL.

No. 801,378. Specification of Letters Patent. Patented Oct. 10, 1905.

Application filed December 4, 1902. Serial No. 133,818.

*To all whom it may concern:*

Be it known that I, EDWARD HART, a citizen of the United States, residing at Easton, county of Northampton, State of Pennsylvania, have invented certain new and useful Improvements in the Manufacture of Articles from Fusible Material, of which the following is a specification.

My invention relates to the manufacture of articles consisting of material which becomes fusible or at least soft and plastic at high temperatures, and particularly of articles made of a material which is refractory and resistant to the influence of acids.

My invention has especial reference to the manufacture of hollow articles used in chemical works, as containers for acids or for salts undergoing reaction.

The invention consists in a particular manner of manufacturing such articles whereby one portion of the article is first formed and the remainder of the article is then gradually added or built up upon the foundation previously prepared, this procedure being accompanied by the application of heat to fuse and soften the added material, as will be fully described hereinafter and specifically pointed out in the claims.

Two of the many forms of apparatus suitable for carrying out my invention are shown in the accompanying drawings, in which—

Figure 1:
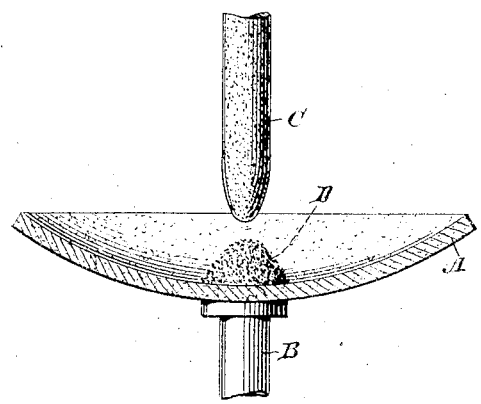
Figure 2:
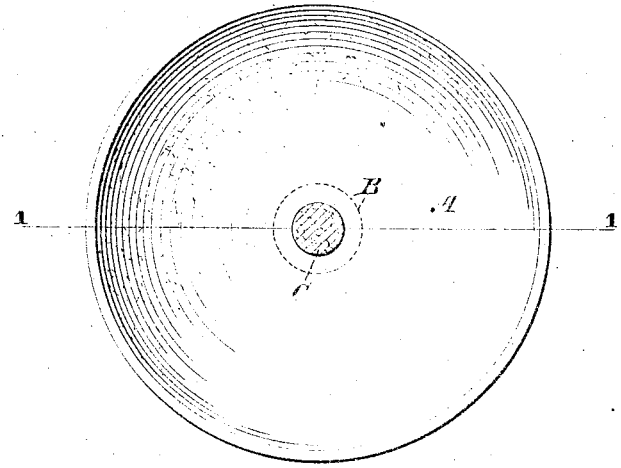
Figure 3:
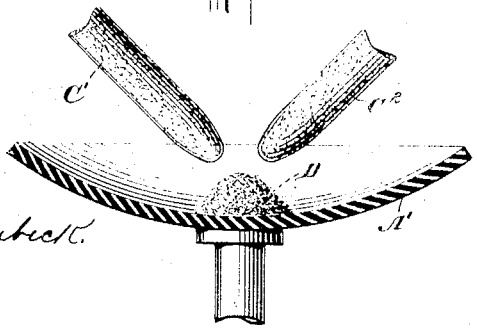

Figure 1 is a sectional elevation of one form of the apparatus on line 1 1 of Fig. 2. Fig. 2 is a plan of this apparatus, and Fig. 3 is a sectional elevation of the other form of the apparatus.

In Figs. 1 and 2, A indicates a mold made of carbon, or it might be metal-lined with graphite or other suitable material, the requirements being simply that the material for the mold should not enter into disturbing reaction with the raw material that is to be formed into the article, as hereinafter described. The said mold, or at least the inner or upper surface thereof, is electrically connected with a conductor B. The apparatus is completed by an electrode C, made of carbon or other suitable material, which is adapted to form an arc between the electrode and the mold when these parts are connected with the terminals of a dynamo or other source of electricity. The electrode C should be movable, so that the arc may be formed at various points of the mold and so that the arc may be shifted during the operation.

The material I prefer to employ in building up articles by fusion or softening is quartz (crushed rock) or highly-silicious sand—that is, a substance very rich in silica. The material is first heaped up in a small mound D at the bottom or center of the mold A, it being understood that the material should preferably be comminuted. Then the current is turned on, so as to produce an arc between the electrode C and the mold A, the electrode being in the central position, as shown, so that the mound D, of quartz or the like, is enveloped in the arc. The material being highly heated will become pasty or plastic, indicating an incipient fusion; but the material does not become really liquid and practically preserves any shape which may be given to it while it is soft. Having thus formed a foundation or central core, I add in the mold at one side of such foundation and in contact therewith a further amount of loose material of the same character and move the electrode C to one side, so that the arc will now envelop the newly-added material. This material will then be fused or softened in the same manner as above described and will become firmly united with the core or foundation so as to form a homogeneous mass therewith. Then further loose material is added at an adjacent point of the periphery of the foundation or core, and at the same time the arc is shifted, and this procedure is continued until a complete ring has been formed around the original core. The simplest method of working when it is desired to produce a cup-shaped dish consists in adding new material gradually along the periphery and moving the electrode C in a helical or spiral path. The form of the article depends partly on that of the mold, but may also be controlled by the operator, according to the manner of adding the loose material and moving the arc. Thus I may produce dishes with a circular edge, or the form of the edge may be varied considerably. The apparatus shown in Fig. 3 comprises a mold A', which in this case is non-conducting, and two electrodes C' C², which may be moved together relatively to the mold, so as to shift the arc from place to place. The electrodes should preferably be held at an angle, as shown, so that they will reflect the heat downward upon the material to be fused or softened. The foundation or core is formed in substantially the same manner as hereinbefore described, and then I apply fresh material adjacent to the edge of the core or foundation and shift the arc so that it will apply heat to the adjacent portions of the foundation and of the new material, thus causing the two portions of the material to fuse together or coalesce. The added material may either be comminuted, as in the case first described, or, and this is preferable in many cases, the material to be added is first fused so as to form a solid coherent mass or piece, which is then placed adjacent to the foundation or core. The advantage of this procedure is that it reduces the liability of the fused materials sticking to the mold.

While I have described the carrying out of my invention by the formation of a central foundation or core followed by the gradual building up of the article from the outer edge of said core, I do not restrict myself to this specific procedure. Several superposed layers of material may be connected by fusion, as hereinbefore described, and the building up may proceed inward as well as outward if the foundation is given a proper shape for this purpose.

The articles are generally hollow, as when a dished mold is employed; but my invention is also applicable to the manufacture of flat or solid articles.

In the manner above described I can manufacture very strong articles from material which it is difficult to utilize for such purposes according to the processes known hitherto. When using highly-silicious material, as I prefer to do, the resulting articles present a glazed surface and are not only very strong, but are little liable to attack by acids and are wholly refractory. They cannot only stand high temperatures, but their coefficient of expansion is so small that an article of this character may be heated to a very high temperature and immediately plunged into cold water without suffering any injury. Articles made of this material in the manner hereinabove described are therefore particularly suited for use in many chemical processes. They also present, as compared with platinum vessels, the advantage of considerable cheapness, and also that there is practically no loss due to wear.

I claim as my invention—

1. The herein-described process of manufacturing articles from quartz and analogous material infusible at ordinary furnace temperatures which consists in providing a central body of loose comminuted material, heating said body so as to soften it, and cause it to form a coherent core, and then applying new material exteriorly of said core and subjecting said material to a fusing heat in a line which extends spirally from the outer edge of the core.

2. The herein-described method of manufacturing quartz vessels which consists in fusing a body of comminuted quartz so as to form it into a coherent foundation and then applying an additional amount of loose comminuted material along the edge of said foundation and subjecting such new material to a fusing heat.

3. The herein-described process of manufacturing a hollow article from quartz, which consists in providing a body of comminuted quartz, then softening the same by heat, thereby causing its particles to stick together and form a foundation, and finally gradually softening by heat fresh material along the edge of said foundation, until said article is completed.

In testimony whereof I have signed my name to this specification in the presence of two subscribing witnesses.

EDWARD HART.

Witnesses:
WILLIAM H. JENKINS,
JOHN LOTKA.